Dec. 21, 1965     J. D. PARSE     3,224,131
LANDING NETS
Filed July 22, 1963
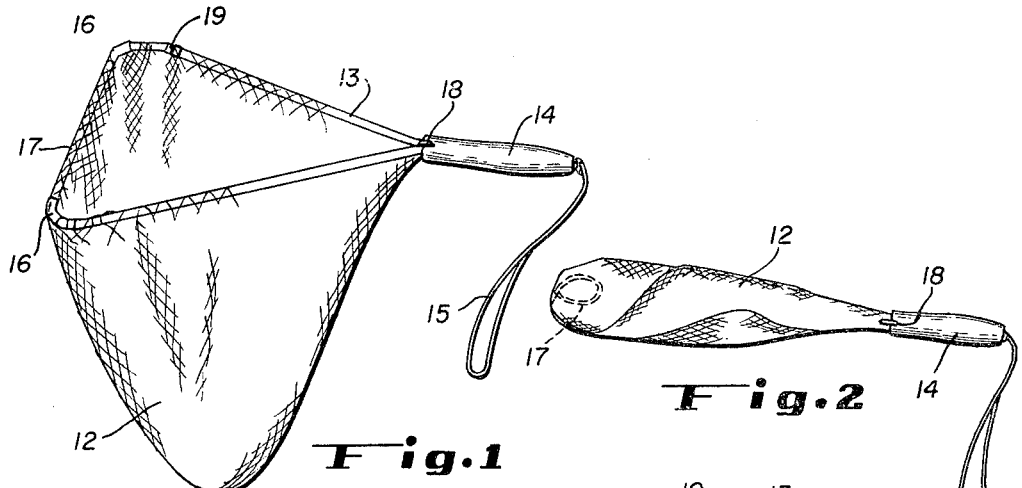
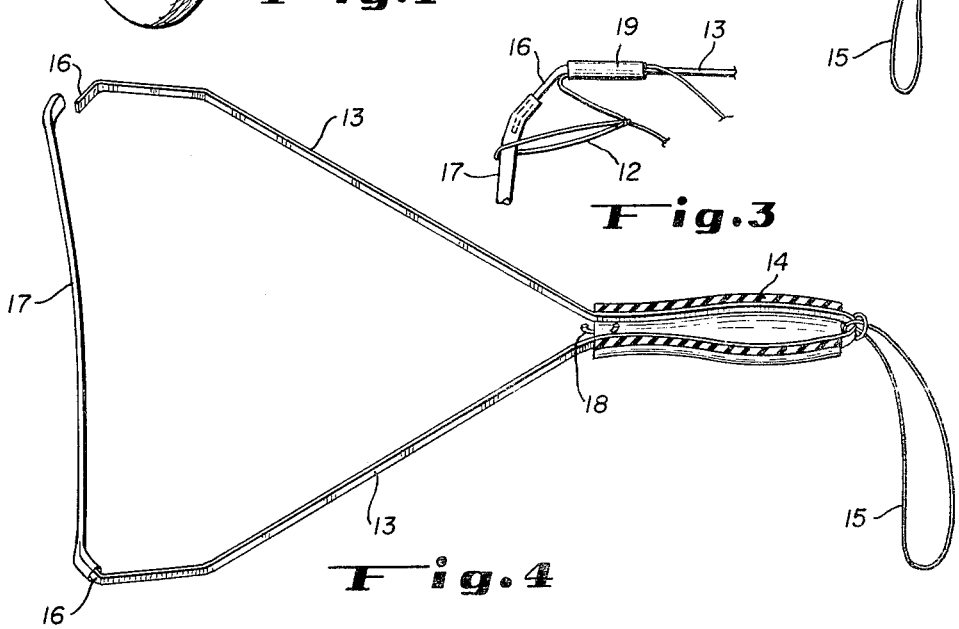
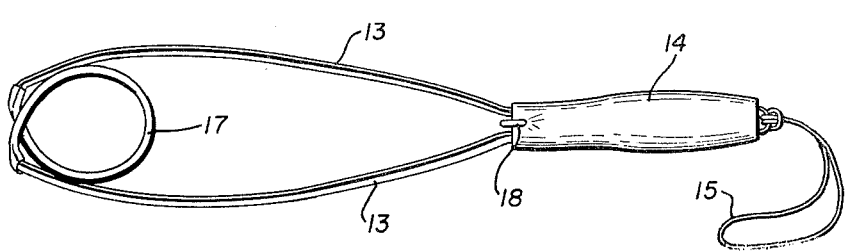
INVENTOR
Joel D. Parse
BY
Enloe Wilkinson
ATTORNEY United States Patent Office 3,224,131
Patented Dec. 21, 1965

3,224,131
LANDING NETS
Joel D. Parse, 830 S. Vrain, Denver, Colo.
Filed July 22, 1963, Ser. No. 296,864
2 Claims. (Cl. 43—12)

The present invention relates to landing nets of the general type used by sportsmen and fishermen and more particularly to collapsible nets. Nets of this type now in use have frames that fold or which may be collapsed to make them more compact for storage purposes or transportation to the fishing grounds. Such nets are unfolded at the beginning of fishing operations and are maintained in operating position until they are returned to storage, at which time they are collapsed.

Nets of this type require that they be placed in operating condition in advance of their anticipated use, since it usually requires two hands and a certain amount of time to place the net in operating condition; consequently the net is carried in operating condition during the entire fishing operation. These nets when carried in operating condition are bulky and frequently become entangled with trees or brush and generally get in the way of the fisherman.

It is, therefore, an object of the invention to provide a landing net which may be moved from inoperative position to an operative position at the instant its use is required.

It is another object to provide a landing net which may be returned quickly to a compact inoperative position with the use of only one hand.

It is a further object to provide a net which, in collapsed position may be easily carried in the pocket or stuffed in the boot top of a fisherman.

Another object is to provide a landing net which will automaticaly move from a collapsed, compact position to an operative position by merely removing it from the confinement of a pocket or boot top.

A further object is to provide a landing net which is efficient in operation and economical to manufacture.

In the drawings:

FIG. 1 is a perspective view of a landing net embodying the invention with the net in operating position.

FIG. 2 is a side elevation of the net in inoperative position.

FIG. 3 is an enlarged fragmentary view of a front corner of the landing net showing the net and frame in detail.

FIG. 4 is a top plan view of the frame of the landing net in operating position with the frame shown in cross section.

FIG. 5 is a top plan view of the frame and handle in inoperative position.

Referring to the drawings more in detail, the net or mesh portion of the device is indicated generally at 12. This net portion is of the usual type having loops or portions formed around its upper margin through which a frame 13 may be threaded or otherwise secured to it.

The frame 13 may be made of spring steel or other resilient material and in the embodiment shown extends into the handle 14 with a portion of the frame extending through the handle sufficiently for a cord 15 to be attached to it. The handle 14 is tubular in shape and may be made of plastic, rubber, wood or other material. Where the frame 13 is doubled upon itself and inserted in the handle 14, the outer portions of the frame will automatically assume the position shown in FIGS. 1 and 4. The arms 13 of the frame may be separate units connected together adjacent one end to form a handle with the other ends extending outwardly, the frame normally assuming the position shown in FIGS. 1 and 3.

The outer ends of the frame 13 are bent inwardly as indicated at 16. These ends are connected together by a resilient member 17, which in the present embodiment is a plastic tube. The ends of the tube are slipped over the ends 16 of the frame 13 and are frictionally or otherwise held in engagement with the ends 16. The member 17 may be made of plastic, rubber or other flexible material. The tubular shape of the member 17 makes for a rapid and secure connection; it is apparent, however, that the member 17 could be connected to the ends 16 in other manners and need not necessarily be tubular.

At the time the ends of the member 17 are connected to portions 16 of the frame, the member 17 is twisted slightly; this causes it to curl inwardly as shown in FIGS. 2 and 5 when the frame 13 is compressed; consequently the possibility of it curling outwardly in an awkward position is eliminated. Prior to the time the ends of member 17 are connected to the ends 16 of the frame, the upper margin of the net 12 may be threaded on frame and member 17 or otherwise secured to them. The upper margin of the net adjacent the handle 14 is secured to the handle by a clip 18, hog ring or any other suitable manner; the upper margin of the net may be tied or otherwise secured to the frame as indicated at 19 in FIGS. 1 and 3 which prevents the net from sliding on the frame.

In operation, the frame 13 may be easily compressed with one hand of the operator so that it assumes the position shown in FIGS. 2 and 5. A flip of the wrist will cause the net 12 to wrap around the frame 13 as shown in FIG. 2. The net 12 then may be easily slipped into a pocket or boot top of the operator. When immediate use is anticipated, it is merely necessary to grasp the handle 14 and remove the landing net from the pocket or boot and the frame 13 will snap into the position shown in FIGS. 1 and 4. The net portion 12 will automatically assume the position shown in FIG. 1 when the frame snaps open.

It is to be understood that the foregoing description is by way of illustration and not limitation and that various modifications may be made without departing from the spirit of the invention or the scope of the claims.

I claim:

1. A landing net comprising a handle, a pair of resilient arms normally diverging from said handle, a resilient connecting member having a twist in it intermediate its extremities joining the outer ends of said arms, whereby the arms may be compressed toward each other causing said connecting member to coil inwardly between said arms and toward said handle, the arms being adapted to spread apart when decompressed and hold said connecting member under tension in a straight line between the ends of said arms and a net mounted on said arms and connecting member.

2. A landing net comprising a handle, a pair of resilient arms normally diverging from said handle, a resilient tubular member having a twist in it intermediate its extremities connecting the outer ends of said arms, the outer ends of said arms being inserted into the ends of said resilient tubular member, whereby the arms may be compressed toward each other causing said tubular member to coil inwardly between said arms and toward said handle, the arms being adapted to spread apart when decompressed and hold said resilient tubular member in a straight line between the ends of said arms, the arms being adapted to snap apart when decompressed and hold said resilient tubular member in a straight line between the ends of said arms and a net mounted on said arms and resilient tubular member.

References Cited by the Examiner

UNITED STATES PATENTS

| | | | |
|---|---|---|---|
| 1,169,311 | 1/1916 | Walter | 43—12 |
| 1,921,596 | 8/1933 | Walter | 43—12 |
| 2,491,703 | 12/1949 | Bell | 43—12 |
| 2,579,748 | 12/1951 | Matthews | 43—12 |
| 2,814,899 | 12/1957 | Brosius | 43—12 |
| 2,874,506 | 2/1959 | Cliff | 43—11 |

ABRAHAM G. STONE, *Primary Examiner.*